Figure 1:
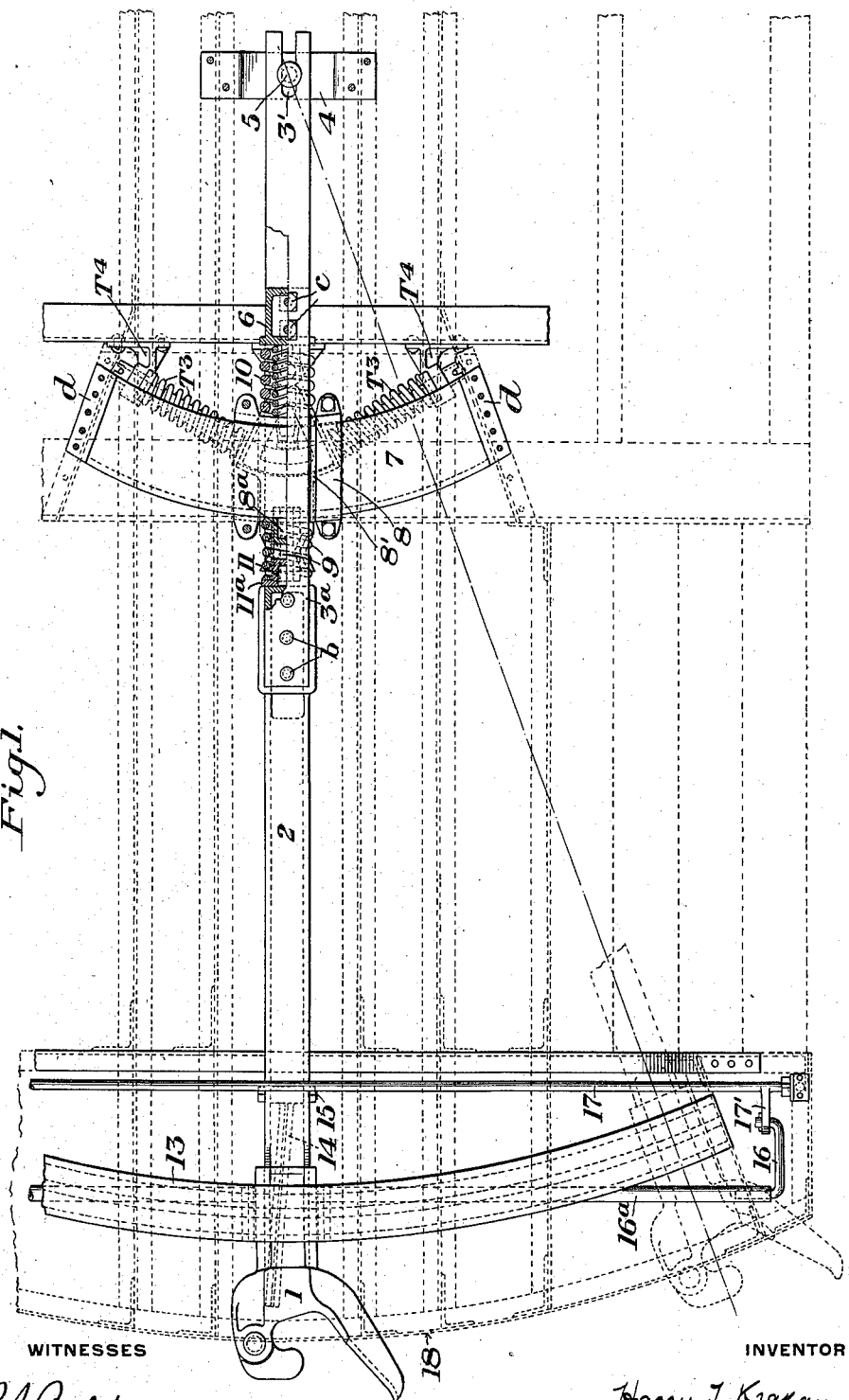

H. T. KRAKAU.
RADIAL DRAFT GEAR.
APPLICATION FILED DEC. 31, 1908.

984,957.

Patented Feb. 21, 1911.
4 SHEETS—SHEET 1.

WITNESSES
R. A. Balderson
G. L. Winters

INVENTOR
Harry T. Krakau
by Bakewell Byrnes Parmelee
his attorneys

H. T. KRAKAU.
RADIAL DRAFT GEAR.
APPLICATION FILED DEC. 31, 1908.
984,937.
Patented Feb. 21, 1911.
4 SHEETS—SHEET 2.
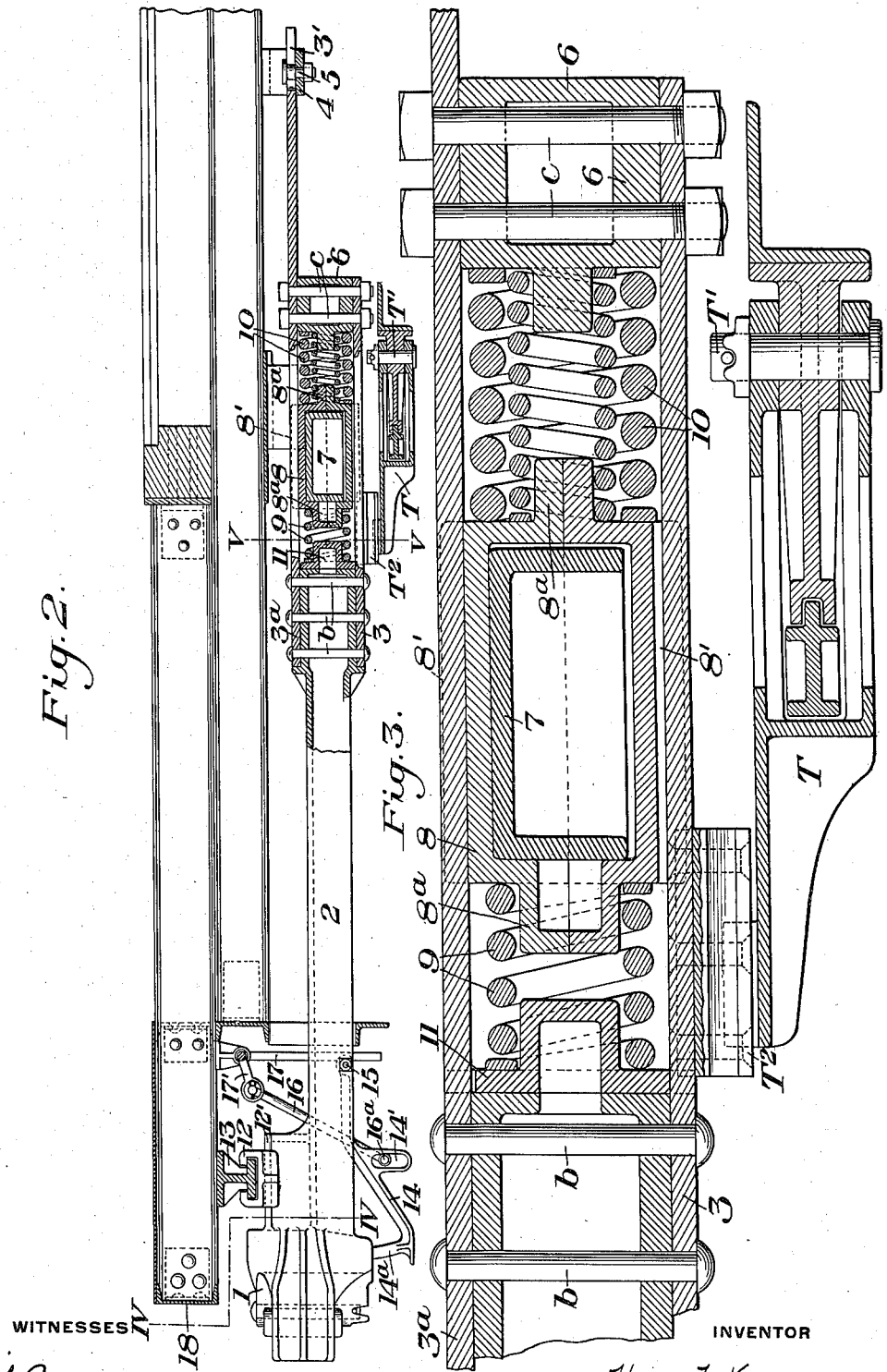
WITNESSES
R. A. Balderson
G. L. Winters
INVENTOR
Harry T. Krakau
by Bakewell Byrnes Parmelee
his Attorneys H. T. KRAKAU.
RADIAL DRAFT GEAR.
APPLICATION FILED DEC. 31, 1908.
984,937.
Patented Feb. 21, 1911.
4 SHEETS—SHEET 3.
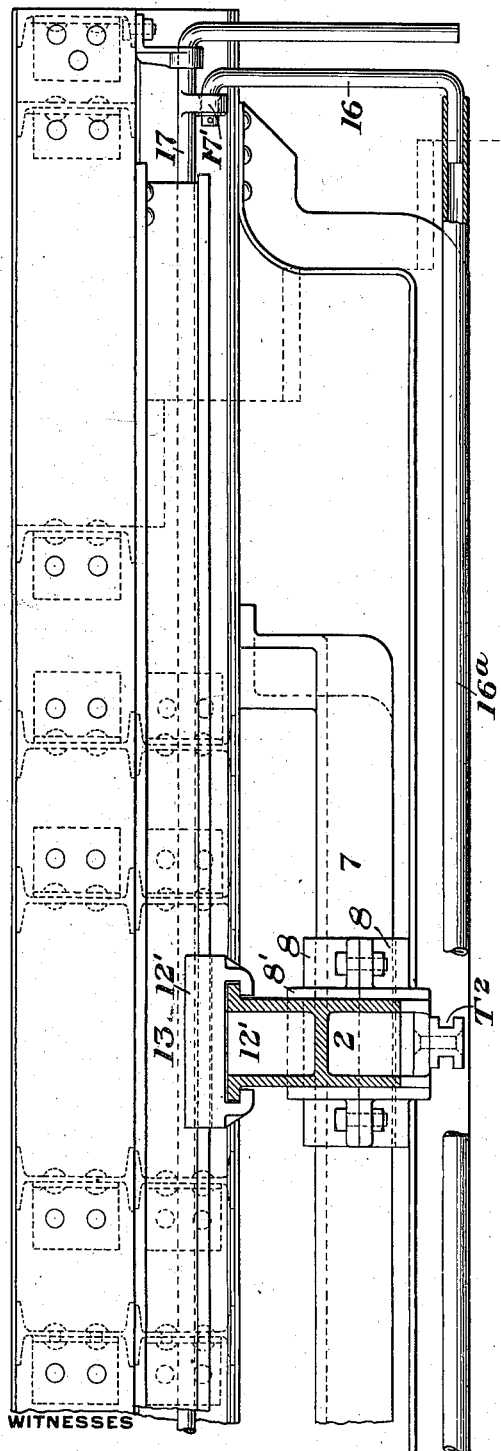
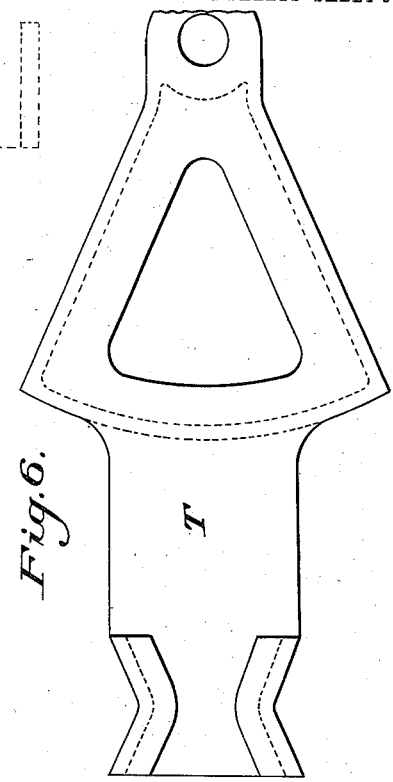
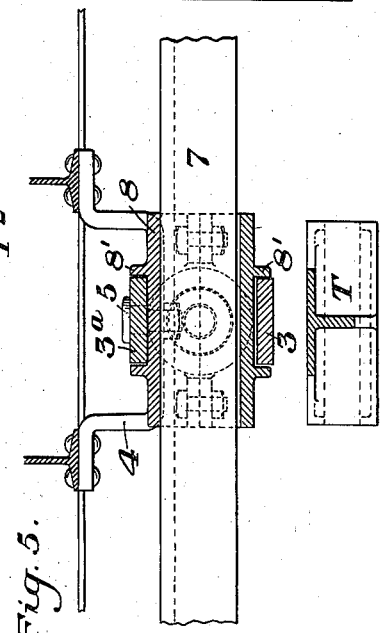
WITNESSES
INVENTOR

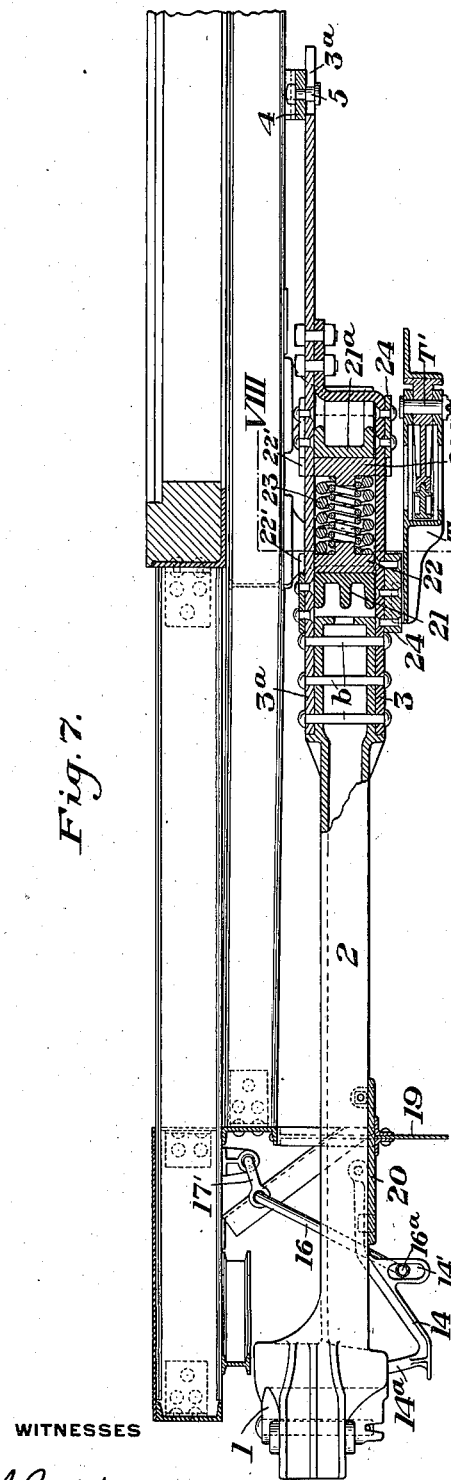

UNITED STATES PATENT OFFICE.

HARRY T. KRAKAU, OF CLEVELAND, OHIO, ASSIGNOR TO THE NATIONAL MALLEABLE CASTINGS COMPANY, OF CLEVELAND, OHIO, A CORPORATION OF OHIO.

RADIAL-DRAFT GEAR.

984,937. Specification of Letters Patent. Patented Feb. 21, 1911.

Application filed December 31, 1908. Serial No. 470,185.

*To all whom it may concern:*

Be it known that I, HARRY T. KRAKAU, of Cleveland, Cuyahoga county, State of Ohio, have invented a new and useful Radial-Draft Gear, of which the following is a full, clear, and exact description, reference being had to the accompanying drawings, forming part of this specification, in which—

Figure 1 is a plan view partly in section illustrating the application of my invention to car and truck frame; Fig. 2 is a longitudinal sectional view of the parts shown in Fig. 1; Fig. 3 is a sectional detail view of the parts shown in Fig. 2; Fig. 4 is a front elevation partly in section, on the line IV—IV of Fig. 2; Fig. 5 is a cross section on the line V—V of Fig. 2; Fig. 6 is a detail view of the truck connection T; Fig. 7 is a longitudinal section similar to Fig. 2, showing a modification; and Fig. 8 is a sectional detail view on the line VIII—VIII of Fig. 7.

The draft gear is pivotally connected to the car frame in such manner as to permit longitudinal motion in buffing and draft, preferably by slotting the connection of the yoke to the pivot, and springs which act respectively in buffing and draft, are mounted to move radially with the draft gear and are set on opposite sides of a fixed abutment. I preferably effect this as follows:—

In the drawings, 1 represents the coupler head having a shank 2 which, at its rear end, is formed with a shouldered or a recessed portion to which the arms 3, 3ª of the yoke are secured by rivets *b* or otherwise. The arms of the yoke are separate from one another, and the upper arm 3ª extends rearwardly to a support 4 carrying a pin 5 which passes through a slot 3' in the arm of the yoke. This pin 5 acting within the slot 3' constitutes the pivotal center on which the draft gear turns radially, but by reason of the slotted connection no strain of draft or buffing is put upon it and it is therefore not necessary to make it of great strength.

The arms 3, 3ª of the yoke are fixed together by a follower 6 which is bolted rigidly between them by bolts *c* or otherwise. A fixed segment 7 passes between the arms of the yoke and is secured at its ends to the car frame at *d*. The forward and rear faces of this segment are curved on arcs whose center is the pivotal center 5.

To constitute a sliding bearing between the yoke and the segment there is a sleeve 8 which fits loosely around the segment within the members 3, 3ª of the yoke and has lateral flanges 8' which extend vertically at the sides of the said arms so that the sleeve is caused to travel laterally therewith in the radial motions of the yoke. At the front and rear ends of the sleeve, respectively, and preferably formed integral therewith, are spring-seats 8ª against which the forward spring 9 and the rear spring 10, which is preferably a double spring, respectively abut. 11 is a follower at the rear of the coupler shank which is also formed with a spring seat against which the front end of the spring 9 has a bearing, and it also has, at its sides, lugs 11ª which fit laterally against the members of the yoke so as to hold the follower in place.

The coupler is supported at its forward end by a carrier 12 which is slidingly connected by lips or flanges to a support 13 secured to the bottom of the car platform, this support being curved on an arc whose center is the pin 5. The bottom of the carrier 12 is lipped over a T-shaped slideway 12' on the top of the coupler shank so that motion, both longitudinal and radial, is permitted to the coupler.

The draft gear has a truck connection T which is pivotally connected to the truck by a pin T' and has a sliding connection at T² with the yoke. This truck connection has lateral springs T³ which bear against it on opposite sides and also bear against brackets T⁴ on the truck frame. These springs permit lateral deflection of the coupler from its normal position, but are sufficiently stiff to move the coupler laterally without compression when the coupler moves with the truck in passing around a curve in the track, thus guiding the coupler substantially to the center of the track into proper position for coupling with the coupler of another car.

To operate the locking and opening device of the coupler from the bottom there is a forwardly extending lever 14 pivoted to the coupler shank at 15 and having an upwardly projecting arm 14ª which enters an opening at the bottom of the coupler and engages the locking and opening mechanism therein. The coupler shank is not rectangular in cross section but is in the shape of a channel, as shown in Figs. 2 and 4, and having a web at the top. The coupler shank is open at the bottom so that the lever 14 passes between the walls of the shank; and the lever 14 has a vertical eye 14' for passage of the horizontal portion 16ª of the uncoupling lever 16 which is pivotally attached at each end to the arm 17' of a lever 17. The portion 16ª of the lever is preferably formed of a pipe into whose open ends the bent portions of the lever 16 extend, so that when the lever 17 is raised at the side of the car it will raise the pivoted upper end of the lever 16, thus through its horizontal member 16ª in the slot 14' raising the lever 14 and operating the parts of the coupler.

In the operation of the device, when the coupler is pulled under draft of the car, the follower 6 will be drawn forwardly with the arms of the yoke 3, 3ª, and the upper arm 3ª will move freely over the pin 5 by reason of the slot 3'. This will compress the spring 10 between the follower 6 and the rear of the sleeve 8, but the forward spring 9 will not be compressed. During buffing the backward motion of the coupler shank acting upon the spring 9 will compress the spring between the follower 11 and the forward face of the sleeve 8, this sleeve being held from longitudinal motion in buffing and draft by the segment 7. The forward spring 9 need not be of as great capacity as the spring 10 and is preferably of less capacity, for the buffing stresses are taken up by the curved end 18 of the car platform, which engages the similarly curved platform of the next car. The coupler in its rear motion being resisted merely by the comparatively light spring 9 will be pushed back to allow the platforms to engage one another and the danger of injurious buckling of the couplers under buffing is thereby avoided. Within the scope of my invention as broadly claimed, the springs may be of equal strength and the forward spring arranged to take the stress of buffing.

In Figs. 7 and 8, the construction is similar to that described above, except that a carry iron 19 supports the coupler shank from below at its forward end, and in this way the parts 12 and 13 and the upper slideway 12', above described are rendered unnecessary. There is a wearing plate 20 attached to the bottom of the coupler shank and riding upon the top of the carry iron 19. This form of the device also differs from that above described in that I only show one spring 23 in the draft rigging. This spring is placed within the curved segment which has forward and rear members 21 and 21ª, between which are followers 22, 22ª. The spring 23 is interposed between these followers and is preferably a double spring, as shown in the drawings. The followers have flanges 22' which project vertically at the sides of the arms of the yoke and retain the followers in place. The flanges are also utilized in moving the followers forwardly and backwardly for the members 3, 3ª of the yoke have attached pads 24 engaging the forward surfaces of the flanges 22' of the forward follower 22 and the rear surfaces of the flanges 22' of the rear follower 22ª. When the coupler is drawn forward in pulling, the members 3, 3ª of the yoke acting through the pads 24 and flanges 22', move the rear follower forwardly, and as the forward follower is held by bearing against the forward member of the segment 21, the spring is compressed against the same. A similar action compressing the spring against the rear member 21ª of the segment takes place during buffing.

The advantages of my invention will be appreciated by those skilled in the art. It affords a strong and simple draft gear adapted to operate successfully in passing around curves of short radius.

The device above described may be changed in form and construction.

I claim:—

1. A draft gear having a coupler mounted to swing radially on the car frame, a transverse segment in advance of the center of motion of the coupler and rigidly secured to the car frame, and springs for buffing and draft arranged in the horizontal plane of the segment, and coacting with the coupler.

2. A draft gear having a coupler mounted to swing radially on the car frame, a transverse forwardly curved segment in advance of the center of motion of the coupler and rigidly secured to the car frame, and springs for buffing and draft arranged in the horizontal plane of the segment, and coacting therewith, said coupler having at its pivotal center a sliding connection.

3. A draft gear having a coupler mounted to swing radially on the car frame, a transverse segment in advance of the center of motion of the coupler, springs for buffing and draft on the forward and rear sides of said segment respectively, and a sleeve slidingly mounted on said segment against which the springs bear.

4. A draft gear having a coupler with a rearwardly extending yoke, said yoke having a sliding pivotal connection with the car frame to swing radially thereon, an intermediate forwardly curved segment in advance of the center of motion of the yoke and along which it moves, said segment being secured to the car frame, and springs for buffing and draft arranged on opposite sides of the segment and in its horizontal plane, and coacting with the coupler.

5. A draft gear having a coupler with rearwardly extending separated yoke arms, said yoke being mounted to swing radially on the car frame, a transverse segment in advance of the center of motion of the yoke and rigidly secured to the car frame, said segment extending between the yoke arms, and springs for buffing and draft arranged in the horizontal plane of the segment and coacting with the coupler.

6. A draft gear having a coupler with a rearwardly extending yoke, a sliding connection pivotally connecting the yoke to the car, an intermediate transverse segment along which the yoke moves, springs on the opposite sides thereof, and a sleeve slidingly connected with the yoke and mounted slidingly on the segment.

7. A coupler mounted for radial motion on the car frame and having in its upper portion projections slidingly engaging a carry iron 12 to allow longitudinal motion of the coupler, said carry iron being slidingly connected to a transversely extending support on the car frame to allow radial motion of the coupler.

In testimony whereof, I have hereunto set my hand.

HARRY T. KRAKAU.

Witnesses:
HENRY F. POPE,
HARRY E. ORR.